US012472840B2

(12) United States Patent
Bryngelsson et al.

(10) Patent No.: US 12,472,840 B2
(45) Date of Patent: Nov. 18, 2025

(54) METHOD FOR CONTROLLING AN ENERGY STORAGE SYSTEM OF A VEHICLE

(71) Applicant: VOLVO TRUCK CORPORATION, Gothenburg (SE)

(72) Inventors: Hanna Bryngelsson, Gothenburg (SE); Edward Jobson, Romelanda (SE)

(73) Assignee: VOLVO TRUCK CORPORATION, Gothenburg (SE)

(*) Notice: Subject to any disclaimer, the term of this patent is extended or adjusted under 35 U.S.C. 154(b) by 317 days.

(21) Appl. No.: 17/440,573

(22) PCT Filed: Mar. 20, 2019

(86) PCT No.: PCT/EP2019/056948
§ 371 (c)(1),
(2) Date: Sep. 17, 2021

(87) PCT Pub. No.: WO2020/187409
PCT Pub. Date: Sep. 24, 2020

(65) Prior Publication Data
US 2023/0271529 A1    Aug. 31, 2023

(51) Int. Cl.
*B60L 58/13* (2019.01)
*B60L 58/16* (2019.01)

(52) U.S. Cl.
CPC ............ *B60L 58/13* (2019.02); *B60L 58/16* (2019.02); *B60L 2240/60* (2013.01)

(58) Field of Classification Search
CPC ...... B60L 58/13; B60L 58/16; B60L 2240/60; Y02T 10/70; Y02T 10/72; Y02T 90/16
See application file for complete search history.

(56) References Cited

U.S. PATENT DOCUMENTS 9,056,556 B1    6/2015  Hyde et al.
2009/0140700 A1  6/2009  Eberhard et al.
(Continued)

FOREIGN PATENT DOCUMENTS

CN    104691541 A    6/2015
CN    105083042 A    11/2015
(Continued)

OTHER PUBLICATIONS

International Search Report and Written Opinion dated Dec. 12, 2019 in corresponding International PCT Application No. PCT/EP2019/056948, 10 pages.
(Continued)

*Primary Examiner* — Navid Z. Mehdizadeh
*Assistant Examiner* — Micah Chuen-Him Cheng
(74) *Attorney, Agent, or Firm* — Venable LLP; Jeffri A. Kaminski

(57) ABSTRACT

The invention relates to a method for controlling an energy storage system (200) of a vehicle (201), the energy storage system comprising at least one battery pack (202). The method comprises the steps of: —obtaining route planning information relating to an expected travelling route of the vehicle, —determining at least one set operational mode of the energy storage system, —based on at least the obtained route planning information and the at least one set operational mode of the energy storage system, setting a control profile for controlling the energy storage system, —controlling the energy storage system according to the control profile.

15 Claims, 2 Drawing Sheets

(56) References Cited

U.S. PATENT DOCUMENTS

| | | | |
|---|---|---|---|
| 2009/0205890 A1 | 8/2009 | Diegelmann et al. | |
| 2010/0019718 A1 | 1/2010 | Salasoo et al. | |
| 2013/0221916 A1 | 8/2013 | Kelty et al. | |
| 2014/0217976 A1 | 8/2014 | McGrath et al. | |
| 2015/0329003 A1 | 11/2015 | Li et al. | |
| 2016/0368481 A1 | 12/2016 | Nuber et al. | |
| 2018/0141552 A1 | 5/2018 | Marcicki | |
| 2019/0016329 A1* | 1/2019 | Park | B60W 20/40 |
| 2019/0092185 A1* | 3/2019 | Ogawa | G01C 21/3469 |
| 2020/0207235 A1* | 7/2020 | Ozawa | B60L 53/51 |
| 2021/0213934 A1* | 7/2021 | Higuchi | B60W 20/14 |

FOREIGN PATENT DOCUMENTS

| | | |
|---|---|---|
| CN | 105691383 A | 6/2016 |
| CN | 109311396 A | 2/2019 |
| DE | 102014224386 A1 | 6/2016 |
| EP | 2209177 A2 | 7/2010 |
| WO | 2019034695 A1 | 2/2019 |

OTHER PUBLICATIONS

International Preliminary Amendment Report on Patentability dated Feb. 25, 2021 in corresponding International PCT Application No. PCT/EP2019/056948, 18 pages.
Chinese Office Action dated Jun. 4, 2024 in corresponding Chinese Patent Application No. 201980094242.2, 20 pages.
Chinese Office Action dated Jan. 2, 2024 in corresponding Chinese Patent Application No. 201980094242.2, 14 pages.
Chinese Office Action dated Sep. 24, 2024 in corresponding Chinese Patent Application No. 201980094242.2, 8 pages.
Chinese Office Action dated Jan. 16, 2025 in corresponding Chinese Patent Application No. 201980094242.2, 6 pages.

* cited by examiner

METHOD FOR CONTROLLING AN ENERGY STORAGE SYSTEM OF A VEHICLE

CROSS-REFERENCE TO RELATED APPLICATIONS

This application is a U.S. National Stage application of PCT/EP2019/056948, filed Mar. 20, 2019, and published on Sep. 24, 2020, as WO 2020/187409 A1, all of which is hereby incorporated by reference in its entirety.

TECHNICAL FIELD

The invention relates to a method for controlling an energy storage system of a vehicle, the energy storage system comprising at least one battery pack. The invention further relates to a computer program, a computer readable medium, a control unit, and a vehicle.

The invention can be applied in any type of vehicle, such as trucks, buses, cars, and construction equipment. In particular, the invention can be applied in electrically operated heavy-duty vehicles. Although the invention will be described with respect to a bus, the invention is not restricted to this particular vehicle, but may also be used in other vehicles.

BACKGROUND

There is a steady increase in research and development related to propulsion of vehicles with alternative power sources, i.e. power sources being used as alternatives to conventional internal combustion engines. In particular, electrically operated vehicles have emerged as a promising alternative.

There exist various types of electrically operated vehicles. For example, a vehicle can be operated by means of an electric machine solely (all-electric vehicle), or by means of an arrangement comprising both an electric machine and an internal combustion engine. The latter alternative is often referred to as a hybrid vehicle (HEV), and can for example be utilised in a manner in which an internal combustion engine is used for operating the vehicle while driving outside urban areas whereas the electric machine can be used in urban areas or in environments in which there is a need to limit the discharge of harmful pollutants such as carbon monoxide and oxides of nitrogen. Furthermore, a vehicle being operated by means of an internal combustion engine and an electric machine supplied with power from a rechargeable electrical energy storage system is often referred to as a plug-in hybrid electric vehicle (PHEV). A plug-in hybrid electric vehicle uses an energy storage system with rechargeable batteries or another suitable energy source which can be restored into a condition involving a full charge through a connection to an external electric power supply.

In the context of this disclosure, the term "electrically operated vehicles" refers both to pure electric vehicles and to hybrid vehicles.

According to known technology, electric machines are operated by means of an energy storage system (ESS) arranged in the vehicle. Typically, the energy storage system includes one or a plurality of battery packs, wherein each battery pack in turn comprises several individual battery cells. A control unit in the form of a battery management unit (BMU), which is configured to maintain the battery pack in proper operating conditions, may be associated with each battery pack, each BMU being configured to communicate with an ESS control unit. A single battery pack of a plug-in hybrid vehicle may for example be of the lithium-ion type. In the event that a 600 V lithium-ion battery pack is used, approximately 200 battery cells connected in series will then be needed to achieve a desired voltage in order to operate the vehicle. The available range for driving the vehicle depends on certain parameters such as the state of charge (SOC) of the battery pack.

In the case when more than one battery packs are provided in the energy storage system, all battery packs of the energy storage system can typically not be used all the time. Therefore, when building an energy storage system with multiple battery packs, the system is usually, at least in some aspects, over-dimensioned in order to meet requirements relating to for example vehicle performance.

The energy storage systems of electric and hybrid vehicles must generally meet user expectations relating to, among other properties, vehicle performance, driving range, and battery lifetime. However, these properties cannot be simultaneously maximised, since optimising e.g. vehicle performance negatively affects battery life and driving range, and vice versa. The vehicle user may therefore be allowed to select which property to prioritise, by for example selecting an operational mode of the energy storage system.

US 2013/0221916 discloses a method for controlling the energy storage system of a vehicle by selecting an operational mode of the energy storage system of the vehicle. The operational modes include, among others, a standard mode, offering a compromise between performance, driving range and battery life, an extended driving range mode for being able to maximise the distance that the vehicle is able to travel, a performance mode in which available power is prioritised, and an optimal battery life mode in which operational parameters of the energy storage system are set to preset values selected so as to maximise battery life at the expense of driving range and vehicle performance. Selection of a particular operational mode may be carried out by a driver of the vehicle via an infotainment panel inside the vehicle or similar. By selecting a particular operational mode, minimum and/or maximum levels for parameters such as state of charge, battery temperature, and charge and discharge rates are set.

Although there are known methods for controlling the energy storage system of a vehicle by selecting different operational modes, there is still a need for methods that better adapt to the requirements on the particular vehicle.

SUMMARY

A primary object of the invention is to provide a method for controlling an energy storage system of a vehicle, the energy storage system comprising at least one battery pack, which method is in at least some aspect improved with respect to prior art methods, or which method provides an alternative to prior art methods. In particular, it is an object to provide a method by means of which a control profile for controlling the energy storage system can be set in better accordance with current operational conditions of the vehicle.

At least the primary object is achieved by a method according to claim 1. The method comprises the steps of:
  obtaining route planning information relating to an expected travelling route of the vehicle,
  determining at least one set operational mode of the energy storage system, based on at least the obtained route planning information and the at least one set operational mode of the energy storage system, setting a control profile for controlling the energy storage system, controlling the energy storage system according to the control profile.

By taking the route planning information into account when setting a control profile for controlling the energy storage system (ESS) of an electrically operated vehicle, the performance of the ESS may be adapted with respect to parameters that are deemed critical for the vehicle performance or vehicle behaviour at the time, while reducing the performance with respect to parameters that are deemed less important. For example, if hilly terrain is foreseen along the expected travelling route, the control profile may according to the proposed method be adjusted in order to maintain either the battery lifetime, the capacity (driving range) or the power performance of the ESS, depending on the set operational mode.

The method may advantageously be carried out in a control unit of the vehicle or of the ESS.

The ESS may comprise a control unit and a plurality of battery packs, wherein each battery pack may in turn comprise a plurality of rechargeable battery cells.

The route planning information may include or be in the form of topographic data relating to a road topography along the expected travelling route of the vehicle. The route planning information may further include information about traffic conditions along the expected travelling route.

If the energy storage system comprises more than one battery packs, the method may additionally comprise the step of determining a number of active battery packs within the energy storage system, wherein the control profile for controlling the energy storage system is set in dependence on the number of active battery packs. In this way, the control profile may be adapted to the number of battery packs that are active within the energy storage system, ensuring an optimal operation of the ESS.

According to one embodiment, the at least one set operational mode of the energy storage system is at least one of:
  a power operational mode, based on which the control profile is set to control the energy storage system to be able to provide a constant or substantially constant discharging power over time or to be able to provide a predetermined discharging power;
  a capacity operational mode, based on which the control profile is set to control the energy storage system to be able to provide a constant or substantially constant capacity over time or to be able to provide a predetermined capacity;
  a lifetime operational mode, based on which the control profile is set to control the energy storage system to comply with a predetermined requirement on a lifetime of the energy storage system.

The operational modes may also include a standard operational mode, offering a compromise between capacity, performance and battery lifetime. The operational mode may be one set by a driver of the vehicle, e.g. via an interface within the vehicle, such as by pressing a button or via a touchscreen, and/or one set by a fleet owner of a fleet including the vehicle.

By controlling the ESS to be able to provide a constant discharging power over time, the vehicle's power performance becomes predictable, i.e. it is easy to predict how the vehicle will behave over time in various situations, such as in hilly terrain. By controlling the ESS to be able to provide a predetermined discharging power, an upper limit of the discharging power may be set to a temporarily higher level to allow a take-over or travelling up a steep hill with a heavy load and/or without losing speed. The discharging power is to be understood as the power which the battery is able to provide during discharge.

Controlling the ESS to be able to provide a constant capacity over time facilitates predicting of the range/distance that the vehicle can travel without charging, and of the time needed to charge the ESS to be able to travel a certain distance. By controlling the ESS to provide a predetermined capacity, a temporarily increased capacity may be provided to be able to travel a longer distance at the cost of discharging power and/or battery lifetime. Capacity is herein to be understood as usable energy.

Controlling the ESS to comply with a predetermined requirement on a lifetime of the ESS enables prediction of a total battery lifetime of the ESS. The predetermined requirement on the lifetime of the ESS may e.g. be a requirement on at least a predetermined lifetime, or a maximised lifetime. The predetermined requirement may also be to minimise the difference in battery lifetime between individual battery packs of the ESS.

According to a further embodiment, the control profile may be configured to control at least one of a plurality of operational parameters of the energy storage system, wherein the plurality of operational parameters comprise:
  a state of charge, wherein a lower limit above which discharging of the energy storage system is allowed to take place, and/or an upper limit below which charging of the energy storage system is allowed to take place, and/or a capacity window corresponding to a difference between the upper limit and the lower limit of the state of charge, may be set,
  a charging power,
  a discharging power,
  a charging current,
  a discharging current,
  a charging voltage,
  a discharging voltage, and
  a battery temperature.

Target values, ranges and/or threshold values, such as upper and lower limits, for said at least one operational parameter may be determined in dependence on the obtained route planning information, the number of active battery packs (if applicable), and the set operational mode. Typically, upper and lower limits are set for each of the mentioned operational parameters. Depending on the set operational mode, it may be determined which one of said operational parameters to adjust with respect to the mentioned standard operational mode.

According to a further embodiment, the control profile may be set based on a lifetime model of the energy storage system, wherein inputs to the lifetime model include at least the lower and upper limits of the state of charge and the discharging power, and wherein the at least one of the plurality of operational parameters of the control profile is repeatedly updated during use of the vehicle based on the lifetime model. For this purpose, information relating to route planning and the set operational mode of the energy storage system, and if applicable also the number of active battery packs, is continuously collected and used for updating the control profile. Thus, the control profile is possible to adapt to changing conditions, thereby enabling improved lifetime of the energy storage system. Also other parameters such as the discharging power and the battery temperature may be used as inputs to the lifetime model.

According to a further embodiment, if the power operational mode is set, setting the control profile may comprise increasing the lower limit of the state of charge temporarily or over time and/or reducing the capacity window. Setting the control profile in the power operational mode may further comprise setting an increased upper limit for the discharging power, and/or setting maximum values for the discharging voltage and discharging current. The temporary increment and/or reduction is/are herein in comparison with a previous operational mode, or in comparison with a preset lifetime operational mode, or in comparison with the standard operational mode. Increasing the lower limit temporarily allows for a temporary increase in discharging power. Increasing the lower limit of the state of charge over time and/or reducing the capacity window over time is useful when it is desired that the ESS is able to provide the same discharging power over the entire lifetime of the ESS.

According to a further embodiment, if the capacity operational mode is set, setting the control profile may comprise reducing an upper limit of the charging power and/or an upper limit of the discharging power temporarily or over time. Setting the control profile in the capacity operational mode may further comprise reducing the lower limit of the state of charge and/or increasing the upper limit of the state of charge. The temporary reduction is herein in comparison with a previous operational mode, or in comparison with a preset lifetime operational mode, or in comparison with the standard operational mode. Temporarily reducing the upper limit of the charging power and/or the discharging power temporarily increases the driving range, i.e. the distance that the vehicle is able to travel without charging of the ESS. Reducing the upper limit of the charging power and/or the discharging power over time is useful when it is desired that the ESS is able to provide the same capacity over the entire lifetime of the ESS.

According to a further embodiment, if the lifetime operational mode is set, setting the control profile may comprise limiting at least one of an allowable discharging power and the capacity window over time. Thus, the upper limit of the discharging power may be reduced as well as the upper and lower limits of the state of charge. The upper limit of the discharging power and the capacity window may be set to ensure that the ESS complies with the predetermined requirement on the lifetime of the ESS. Also other operational parameters may be limited to ensure compliance with the predetermined requirement.

According to a further embodiment, determining at least one set operational mode of the energy storage system may comprise determining that the lifetime operational mode is a preset operational mode, and receiving a request to set the control profile based on a temporary operational mode corresponding to the capacity operational mode or the power operational mode, wherein the method further comprises:
  determining if the request to set the control profile in accordance with the temporary operational mode is allowable;
  if said request is deemed allowable, setting the control profile in accordance with the temporary operational mode.

If said request is not allowable, the control profile is set in accordance with the lifetime operational mode. Determining if the request to set the control profile in accordance with the temporary operational mode is allowable may e.g. be carried out based on at least the obtained route planning information, and, if applicable, the determined number of active battery packs. For example, if the number of active battery packs is below a predetermined number, the request may be deemed non-allowable. Similarly, if the route planning information indicates that a distance to a nearest charging station is longer than a predetermined distance, a temporary operational mode corresponding to the capacity operational mode may be deemed allowable. The control profile set in accordance with the temporary operational mode is based on at least the obtained route planning information.

An advantage associated with this embodiment is that a temporary depart from a preset lifetime operational mode may be enabled, e.g. when requested by a driver of the vehicle. This may be useful in certain situations, while the lifetime operational mode may remain the default operational mode.

According to a further embodiment, determining if said request is allowable may comprise testing the request against at least one predetermined criterion, and based on an outcome of said test determining if the request is allowable. One criterion may e.g. be that the temporary operational mode corresponds to the capacity operational mode, or alternatively that the temporary operational mode corresponds to the power operational mode. A criterion may also be considered fulfilled given that a previous number of requests do not exceed a predetermined number, or if a state of health of the energy storage system is above a predetermined threshold level (e.g. 85%). The criterion/criteria may also be related to the number of active battery packs and/or to the route planning information. A set of criteria may be used, and the request may be deemed allowable if more than a certain number of criteria are fulfilled, or different criteria may be given different weight in deciding whether the request is allowable or not.

According to a further embodiment, said at least one predetermined criterion may comprise a lifetime criterion, and testing the request comprises:
  based on a lifetime model of the energy storage system, determining an effect that setting the control profile in accordance with the temporary operational mode will have on an expected lifetime of the energy storage system,
  given said effect, determining if the lifetime criterion is fulfilled.

An advantage of this embodiment is that the request for a temporary operational mode may be deemed allowable if it can be complied with without affecting the battery lifetime in an unacceptable way, wherein e.g. a fleet owner of a fleet including the vehicle may be able to decide which deviations in battery lifetime are acceptable. Thus, a driver of the vehicle may be given the freedom to operate the vehicle as desired, as long as this has acceptable effects on the battery lifetime.

According to a further embodiment, if said request to set the control profile in accordance with the temporary operational mode is allowable, the method may further comprise:
  once a predetermined condition is fulfilled, setting the control profile in accordance with the preset lifetime operational mode.

The predetermined condition may e.g. be considered fulfilled after a predetermined time interval, once discharging power decreases to a predetermined level, after travelling a predetermined distance, or similar. An advantage associated with this embodiment is that the lifetime operational mode is automatically resumed, thus ensuring that battery life is prioritised.

According to a further embodiment, the route planning information may comprise topographic data relating to a road topography along the expected travelling route of the vehicle. The route planning information may alternatively or additionally comprise e.g. traffic information and information relating to speed limitations along the expected travelling route. The road topography has a large impact on the energy consumption and power need of the vehicle and it is therefore useful to be able to take this into account when setting the control profile for controlling the ESS, e.g. when determining upper and lower limits for the operational parameters of the control profile.

The route planning information may for example be related to a time duration to an event which may affect the energy and/or power need of the ESS system. The route planning information may further be related to a distance (e.g. a driving range) to such an event. The route planning information may further relate to an upcoming downhill or uphill, or distance to a charging station.

According to a further embodiment, the method may further comprise the step of:
obtaining information relating to a recent use of the vehicle,
wherein the control profile is further set based on the obtained information relating to the recent use of the vehicle.

Information relating to the recent use may comprise data relating to e.g. vehicle speed, vehicle mass, power, auxiliary loads, regeneration and acceleration. The information may also comprise data relating to temperature, state of charge (SOC), current, and voltage of the energy storage system. Such data may be collected and used for setting operational parameters of the control profile. The data may be collected over time, by e.g. recording during driving. An assumption may be made that the future vehicle use will be similar to the recent use.

An advantage of this, in particular in the lifetime operational mode, is that the information illustrates what the vehicle has needed in terms of capacity and power in the past, and it is thereby easier to control the operational parameters of the energy storage system, e.g. to set the lower and upper limits of the state of charge and to set the upper limits for the charging and discharging powers, assuming that the vehicle use will remain the same or similar.

According to a further embodiment, the method may further comprise the step of:
obtaining weather data and energy use data relating to energy use of other vehicles along the expected travelling route,
wherein the control profile is further set based on the obtained weather data and energy use data. Thus, the energy used by other vehicles and weather conditions along the expected travelling route are used to predict energy (capacity) and power needs of the vehicle along the expected travelling route. The weather data and energy use data may e.g. originate from a back office function which may be wirelessly available on-board the vehicle, i.e. the data may be wirelessly communicated to the vehicle.

The invention also relates to a computer program comprising program code means for performing the steps of the proposed method when said computer program is run on a computer and to a computer readable medium carrying a computer program comprising program code means for performing the steps of the proposed method when said computer program is run on a computer. It further relates to a control unit for controlling an energy storage system of a vehicle, the energy storage system comprising at least one battery pack, the control unit being configured to perform the steps of the proposed method.

The invention further relates to a vehicle comprising an energy storage system comprising at least one battery pack, the vehicle further comprising the proposed control unit. The vehicle may be in the form of an electrically operated vehicle, such as a heavy-duty vehicle in the form of a bus, a truck or a construction equipment.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

In the present detailed description, various embodiments of the method according to the present invention are mainly described with reference to an all-electric bus, comprising a propulsion system in the form of battery powered electric motors. However, it should be noted that various embodiments of the described invention are equally applicable for a wide range of hybrid and electric vehicles.

Figure 1:
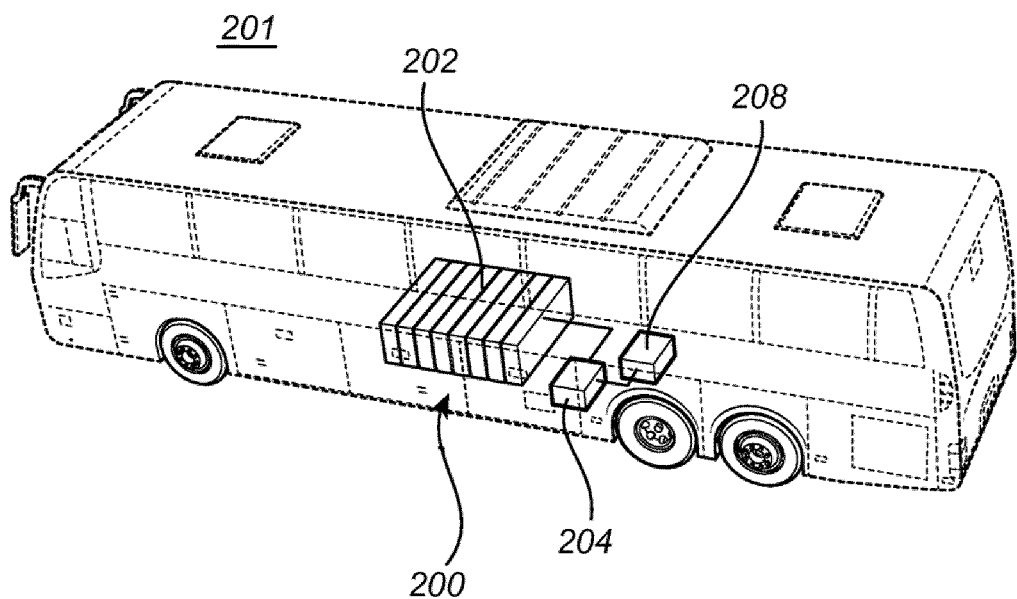
FIG. 1 is a schematic view of a vehicle according to an embodiment of the invention.

FIG. 1 shows a simplified perspective view of an all-electric vehicle in the form of a bus 201, which according to an embodiment is equipped with an electric machine (not shown) for operating the bus.

The bus 201 carries an electric energy storage system (ESS) 200 comprising a battery pack 202, the battery pack comprising a plurality of battery cells. The battery cells are connected in series to provide an output DC voltage having a desired voltage level. Suitably, the battery cells are of lithium-ion type, but other types may also be used. The number of battery cells per battery pack may be in the range of 50 to 500 cells. It is to be noted that the ESS may include a plurality of battery packs.

A sensor unit (not shown) may be arranged for measuring one or more predetermined parameters which are indicative of the state of operation of the associated battery pack 202. Measurement data from each sensor unit is transmitted to an associated battery management unit (BMU) 204, which is configured for controlling the individual battery pack 202 during operation of the bus 1. The BMU 204 can also be configured for determining parameters indicating and controlling the condition or capacity of the battery pack 202, such as the state of charge (SOC), the state of health (SOH) and the state of energy (SOE) of the battery pack 202.

The BMU 204 is connected to and configured to communicate with an ESS control unit 208, which controls the ESS. The ESS control unit 208 may include a microprocessor, a microcontroller, a programmable digital signal processor or another programmable device. Thus, the ESS control unit 208 comprises electronic circuits and connections (not shown) as well as processing circuitry (not shown) such that the ESS control unit 208 can communicate with different parts of the bus 201 or with different control units of the bus 201. The ESS control unit 208 may comprise modules in either hardware or software, or partially in hardware or software, and communicate using known transmission buses such a CAN-bus and/or wireless communication capabilities. The processing circuitry may be a general purpose processor or a specific processor. The ESS control unit comprises a non-transitory memory for storing computer program code and data upon. Thus, the skilled person realizes that the ESS control unit may be embodied by many different constructions.

Figure 2:
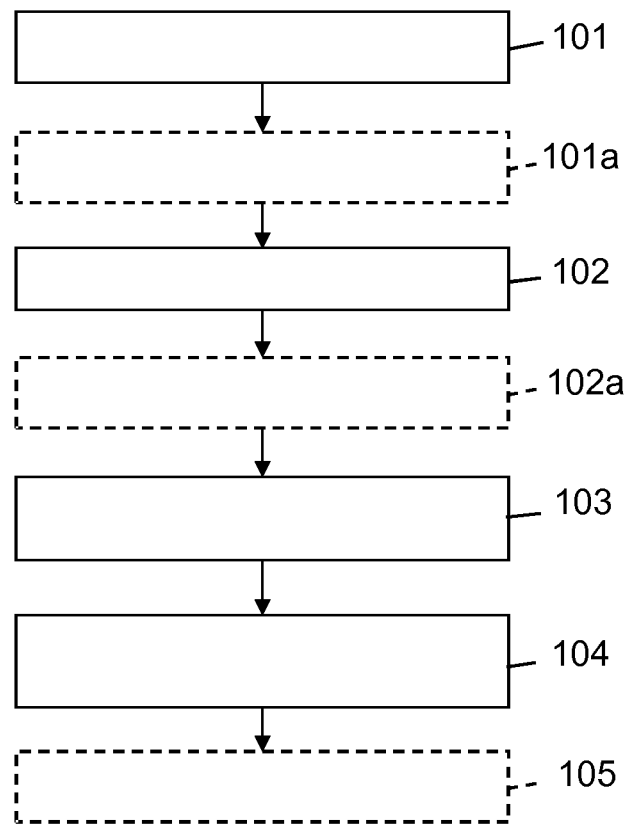
FIG. 2 is a flow chart illustrating a method according to an embodiment.

A method according to an embodiment of the invention is schematically illustrated in FIG. 2. Optional steps are marked with dashed lines. The steps may not necessarily be carried out in the order shown in FIG. 2.

The method steps are in this embodiment carried out in the ESS control unit 208.

In a first step 101, route planning information relating to an expected travelling route of the vehicle is obtained, including e.g. road topographic data and/or traffic data. The route planning information may for example be received in the ESS control unit 208 via a communication unit (not shown) within the vehicle, receiving data from a global navigation satellite system, such as a global positioning system. Alternatively or additionally, the route planning information may be indicative of a predetermined route for the vehicle, wherein the route planning information may be retrieved before the vehicle is operative on the predetermined route. Such predetermined route may for example be locally stored in a memory of the vehicle, or be retrieved from a remote database (e.g. via "the cloud"). Alternatively or additionally, the route planning information may be received from communication units associated with bus stops, via radio frequency identification (RFID), or GSM network, or any other mobile network.

In an optional step 101a, which may be carried out if the energy storage system comprises more than one battery packs, a number of active battery packs within the energy storage system is determined. This may be carried out in the ESS control unit, e.g. by receiving signals from the BMUs of each battery pack indicating whether the respective battery pack is active or not.

In a second step 102, at least one set operational mode of the energy storage system 200 is determined, e.g. by receiving a request from a driver or an owner of the vehicle 201 in which said operational mode is requested. The driver may e.g. request a particular operational mode by using an interface within the vehicle, such as a visual or audio interface, a pushbutton, a switch or similar. An operational mode may also have been set by an owner of the vehicle. Information may also be obtained in the ESS that a temporary depart from a preset operational mode is required, as will be explained in further detail below.

In a third step 103, based on at least the obtained route planning information and the at least one set operational mode of the energy storage system, and if applicable also the determined number of active battery packs, a control profile for controlling the energy storage system is set. The control profile may be configured to control one or more of a plurality of operational parameters of the energy storage system, including e.g. a state of charge, a charging power, a discharging power, a charging current, a discharging current, a charging voltage, a discharging voltage, and a battery temperature. For this purpose, upper and lower limits as well as target values and/or ranges for the operational parameters of the ESS may be set. This will be discussed in further detail below.

In a fourth step 104, the energy storage system is controlled according to the control profile. This may e.g. be carried out via the ESS control unit 208, configured to communicate with the individual BMUs 204 of each battery pack 202. If the energy storage system 200 comprises a single battery pack 204, the ESS control unit 208 may be separate from the BMU of the battery pack 202 as shown in FIG. 1, but the method steps described above may also be implemented in the BMU of the individual battery pack.

The at least one set operational mode of the ESS 200 may be a power operational mode, a capacity operational mode or a lifetime operational mode. Typically, the lifetime operational mode may be set as a default, or preset, operational mode, from which temporary departures may be allowed. The operational modes may also include a standard operational mode, set to offer a compromise between battery properties.

In a power operational mode, the control profile is set to control the energy storage system to be able to provide a constant or substantially constant discharging power over time or to be able to provide a predetermined discharging power. Thus, either a power operational mode may be selected to achieve a predictable power performance of the vehicle over time, or in order to temporarily increase the power output from the ESS. Several different power operational modes may thus be available, of which one is adapted to control the ESS to be able to provide a specific predetermined power during a predetermined time interval and one is adapted to control the ESS to be able to provide a constant or at least similar power during the lifetime of the ESS.

In a capacity operational mode, the control profile is set to control the energy storage system to be able to provide a constant or substantially constant capacity over time, or to provide a predetermined capacity. The capacity is indicative of the driving range of the vehicle, thus the capacity operational mode may be selected if it is desired to maintain the driving range of the vehicle over the lifetime of the ESS, or alternatively it may be selected temporarily to increase the driving range. Similarly to the power operational modes, several different capacity operational modes may be available, adapted to control the ESS either to maintain a constant or similar capacity over time, or to provide an increased capacity during a predetermined time period or road stretch.

In the lifetime operational mode, the control profile is set to control the energy storage system to comply with a predetermined requirement on a lifetime of the energy storage system. In this operational mode, the capacity and the discharging power will be limited so that a long battery lifetime is prioritised over driving range and power performance. Also the battery temperature may be controlled to achieve a long battery lifetime.

The control profile may be set based on a lifetime model of the energy storage system 200. Inputs to the lifetime model include at least the lower and upper limits of the state of charge and the discharging power. The lifetime model may be continuously updated during use of the vehicle 201 with data relating to the use of the ESS 200. The operational parameters of the control profile may in this case be repeatedly updated during use of the vehicle 201, based on the lifetime model.

The following operational parameters of the ESS 200 may according to embodiments of the invention be controlled depending on the set operational mode:

State of Charge (SOC):

A lower limit above which discharging of the energy storage system is allowed to take place, and/or an upper limit below which charging of the energy storage system is allowed to take place, and/or a capacity window corresponding to a difference between the upper limit and the lower limit of the state of charge, may be set. A relatively large capacity window is beneficial in the capacity operational mode, while as the capacity window may be narrower in the lifetime operational mode and in the power operational mode. In particular, the upper limit may be reduced and the lower limit increased over time in order to maintain a constant or similar power performance of the ESS over time.

Charging Power:

The charging power required for charging the ESS may be reduced temporarily in order to temporarily increase the capacity window, and thereby the driving range, of the ESS. If a similar or constant driving range is to be maintained over the lifetime of the ESS, the charging power may be reduced over time. An upper limit may thus be set for the charging power, in particular in the lifetime operational mode.

Charging Voltage:

An upper limit for the charging voltage may be set to improve the battery lifetime.

Charging Current:

An upper limit for the charging current may be set to improve the battery lifetime. Furthermore, an upper limit may be set for a root mean square (rms) value of the charging current as measured over a specific time interval.

Discharging Power:

An upper limit of the discharging power, i.e. the maximum power that the ESS is allowed to deliver, may similarly to the charging power be reduced temporarily in order to temporarily increase the capacity window, and thereby the driving range, of the ESS. If a similar or constant driving range is to be maintained over the lifetime of the ESS, the upper limit of the discharging power may be reduced over time. In aged condition, the discharging power that the ESS is able to deliver will thereby be reduced. In the power operational mode, the upper limit of the discharging power may instead be increased such that the ESS is able to deliver a temporarily higher discharging power, or the upper limit may be set to a constant value over the lifetime of the ESS, requiring adjustments of the SOC upper and/or lower limit(s). The discharging power may be controlled in terms of discharging voltage and/or discharging current.

Discharging Voltage and Discharging Current:

An upper limit of the discharging voltage and/or discharging current may be set to improve battery lifetime.

Battery Temperature:

The battery temperature, i.e. the temperature of the ESS or of individual battery packs of the ESS, may be controlled to specific temperature ranges or target values. Different ranges or target values may be used for charging and discharging of the ESS. For the lifetime operational mode, at least an upper limit of the battery temperature may be set to ensure that the ESS complies with the predetermined requirement on battery lifetime.

Figure 3A:
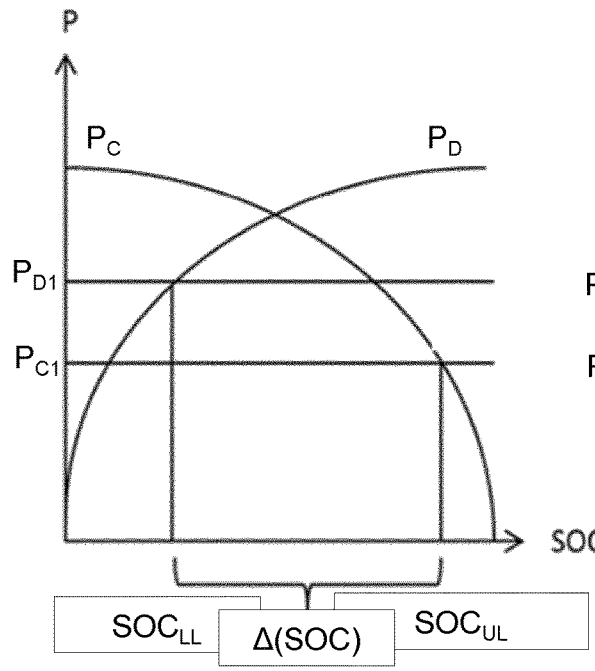
FIG. 3*a-b* are diagrams schematically showing charging/discharging curves.
Figure 3B:
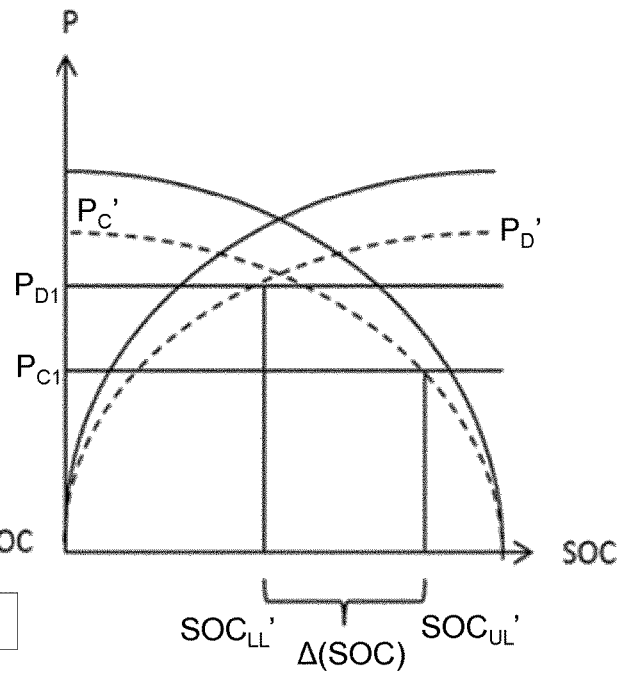

FIGS. 3a-3b show an example of how the capacity window $\Delta(SOC)$ of an ESS may be adjusted over time in the power operational mode, wherein the power operational mode is set to be able to provide a constant discharging power over time. FIG. 3a illustrates the charging power $P_C$ and the discharging power $P_D$ as a function of the state of charge SOC when the ESS is new. The ESS may in this case be charged to a set SOC upper limit $SOC_{UL}$ (upper limit of capacity window) using a required charging power $P_{C1}$. A lower limit $SOC_{LL}$ of the capacity window $\Delta(SOC)$ is set so that the ESS is able to deliver a required discharging power $P_{D1}$ within the capacity window. The capacity window $\Delta(SOC)$, and thus the driving range, is relatively large when the ESS is new. As the ESS ages, as illustrated by the dashed curves in FIG. 3b, the charging power $P_{C'}$ required to charge the ESS to a particular SOC is reduced as well as the maximum discharging power $P_{D'}$ available at a particular SOC. If the control profile is set to control the ESS to be able to provide a constant required discharging power $P_{D1}$ over time, as well as to be able to be charged at a constant required charging power $P_{C1}$, the upper and lower limits of the SOC have to be adjusted to an upper limit $SOC_{UL'}<SOC_{UL}$ and a lower limit $SOC_{LL'}>SOC_{LL}$, respectively. The capacity window is thereby reduced over time.

If on the other hand the discharging power is required to be temporarily increased to a higher required discharging power (not shown), the capacity window $\Delta(SOC)$ is temporarily reduced to a more narrow interval by setting the lower limit $SOC_{LL}$ to an increased value, such that the required discharging power may be provided at the expense of driving range.

Figure 4:
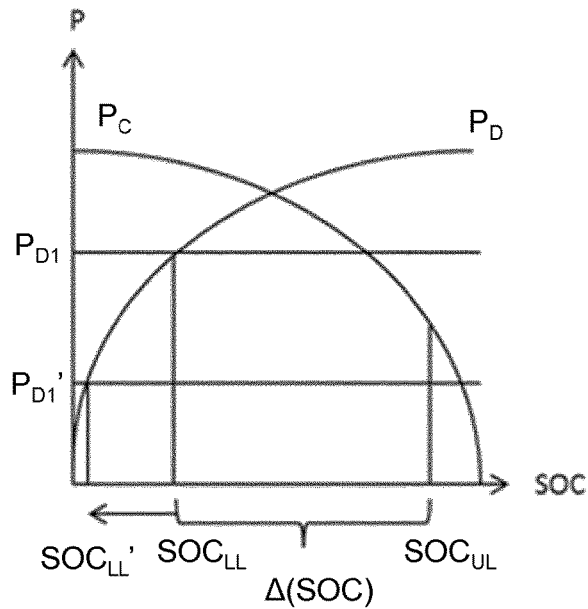
FIG. 4 is another diagram showing charging/discharging curves.

FIG. 4 shows another example in which the capacity mode is selected. In this example, a temporary increase in capacity is needed, e.g. to be able to cover a larger distance. The maximum discharging power $P_{D1}$ that the ESS may deliver is therefore temporarily reduced to a level $P_{D1'}$, at which the required capacity is achieved. The lower limit $SOC_{LL}$ of the capacity window, above which discharging is allowed to take place, is in this case reduced to the temporary lower limit $SOC_{LL'}$. The upper limit $SOC_{UL}$ of the capacity window, up to which the ESS may be charged, remains constant in the shown example. The capacity window may instead be maintained over time by reducing the charging power and/or the discharging power over time, in particular by reducing the maximum discharging power that the ESS may deliver.

The lifetime operational mode may be set as a preset operational mode, and the ESS control unit controls the ESS using a control profile set in accordance with the lifetime operational mode. If requested by e.g. a driver of the vehicle, a temporary depart from the lifetime operational mode may be allowed. In this case, a request is in the second step 102 received in the ESS control unit to set a temporary operational mode corresponding to the capacity operational mode or the power operational mode. In the ESS control unit, it is thus in step 102 determined that the lifetime operational mode is a preset operational mode and that a temporary operational mode is requested.

In a step 102a, is determined if the request to set the control profile in accordance with the temporary operational mode is allowable. This may e.g. be carried out by testing the request against at least one predetermined criterion, and based on an outcome of said test determining if the request is allowable. Several criteria may be used. For example, a lifetime criterion may be included. In this case, an effect that setting the control profile in accordance with the temporary operational mode will have on an expected lifetime of the energy storage system is determined based on the lifetime model of the ESS. The expected effect is compared to a predetermined requirement relating to the battery lifetime of the ESS, and it is determined if the lifetime criterion is fulfilled. If fulfilled, the request is deemed allowable.

If the request is deemed allowable, the control profile is in the step 103 set in accordance with the temporary operational mode and the ESS is in step 104 controlled in accordance with the control profile. If the request is not deemed allowable, the control profile is set in accordance with the lifetime operational mode. The ESS may also provide a response indicative of whether the request has been deemed allowable or not, for information purposes.

In a step 105, once a predetermined condition is fulfilled, such as that a predetermined time period has passed, the control profile is once again set in accordance with the preset lifetime operational mode.

The method may also include a step (not shown) of obtaining information relating to a recent use of the vehicle, wherein the control profile is further set based on the obtained information relating to the recent use of the vehicle.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments hereof, many different alterations, modifications and the like will become apparent for those skilled in the art.

It is to be understood that the present invention is not limited to the embodiments described above and illustrated in the drawings; rather, the skilled person will recognize that many changes and modifications may be made within the scope of the appended claims.

The invention claimed is:

1. A method for controlling an energy storage system of a vehicle, the energy storage system comprising at least one battery pack, the method comprising:
   obtaining route planning information relating to an expected travelling route of the vehicle,
   determining at least one set operational mode of the energy storage system,
   based on at least the obtained route planning information and the at least one set operational mode of the energy storage system, setting a control profile for controlling the energy storage system,
   controlling the energy storage system according to the control profile, wherein the at least one set operational mode of the energy storage system is a lifetime operational mode, based on which the control profile is set to control the energy storage system to comply with a predetermined requirement on a lifetime of the energy storage system, wherein determining at least one set operational mode of the energy storage system comprises determining that the lifetime operational mode is a preset operational mode, and receiving a request to set the control profile based on a temporary operational mode corresponding to a capacity operational mode or a power operational mode, further comprising:
   determining if the request to set the control profile in accordance with the temporary operational mode is allowable, comprising testing the request against at least one predetermined criterion, and based on an outcome of said test determining if the request is allowable,
   if said request is deemed allowable, setting the control profile in accordance with the temporary operational mode, wherein, if the power operational mode is set, setting the control profile comprises increasing a lower limit of a state of charge ($SOC_{LL}$) temporarily or over time and/or reducing a capacity window ($\Delta(SOC)$), and/or wherein, if the capacity operational mode is set, setting the control profile comprises reducing an upper limit of the charging power ($P_{C1}$) and/or an upper limit of a discharging power ($P_{D1}$) temporarily or over time,
   if said request to set the control profile in accordance with the temporary operational mode is deemed not allowable, rejecting the request and setting the control profile in accordance with the lifetime operational mode,
   wherein said at least one predetermined criterion comprises a lifetime criterion, and wherein testing the request comprises:
   based on a lifetime model of the energy storage system, determining an effect that setting the control profile in accordance with the temporary operational mode will have on an expected lifetime of the energy storage system,
   given said effect, determining if the lifetime criterion is fulfilled.

2. The method according to claim 1, wherein the at least one set operational mode of the energy storage system is further at least one of:
   the power operational mode, based on which the control profile is set to control the energy storage system to be able to provide a constant or substantially constant discharging power ($P_{D1}$) over time or to be able to provide a predetermined discharging power;
   the capacity operational mode, based on which the control profile is set to control the energy storage system to be able to provide a constant or substantially constant capacity over time or to provide a predetermined capacity.

3. The method according to claim 1, wherein the control profile is set based on a lifetime model of the energy storage system, wherein inputs to the lifetime model include at least the lower and upper limits of the state of charge ($SOC_{LL}$, $SOC_{UL}$) and the discharging power ($P_{D1}$), and wherein the at least one of the plurality of operational parameters of the control profile is repeatedly updated during use of the vehicle based on the lifetime model.

4. The method according to claim 1, wherein, if the lifetime operational mode is set, setting the control profile comprises limiting at least one of an upper limit for the discharging power ($P_{D1}$) and the capacity window ($\Delta(SOC)$) over time.

5. The method according to claim 1, wherein, if said request to set the control profile in accordance with the temporary operational mode is allowable, the method further comprises:

once a predetermined condition is fulfilled, setting the control profile in accordance with the preset lifetime operational mode.

6. The method according to claim 1, wherein the route planning information comprises topographic data relating to a road topography along the expected travelling route of the vehicle.

7. The method according to claim 1, further comprising the step of:

obtaining information relating to a recent use of the vehicle, wherein the control profile is further set based on the obtained information relating to the recent use of the vehicle.

8. A non-transitory computer readable medium carrying a computer program comprising program code for performing the steps of claim 1 when said computer program is run on a computer.

9. A control unit for controlling an energy storage system of a vehicle, the energy storage system comprising at least one battery pack, the control unit being configured to perform the steps of the method according to claim 1.

10. A vehicle comprising an energy storage system comprising at least one battery pack, the vehicle further comprising a control unit according to claim 9.

11. The method according to claim 1, wherein the route planning information comprises traffic information and/or information relating to speed limitations along the expected travelling route.

12. The method according to claim 1, further comprising obtaining weather data and energy use data relating to energy use of other vehicles along the expected travelling route, wherein the control profile is further set based on the obtained weather data and energy use data.

13. A method for controlling an energy storage system of a vehicle, the energy storage system comprising at least one battery pack, the method comprising:

obtaining route planning information relating to an expected travelling route of the vehicle, determining at least one set operational mode of the energy storage system, based on at least the obtained route planning information and the at least one set operational mode of the energy storage system, setting a control profile for controlling the energy storage system, controlling the energy storage system according to the control profile, wherein the at least one set operational mode of the energy storage system is a lifetime operational mode, based on which the control profile is set to control the energy storage system to comply with a predetermined requirement on a lifetime of the energy storage system, wherein determining at least one set operational mode of the energy storage system comprises determining that the lifetime operational mode is a preset operational mode, and receiving a request to set the control profile based on a temporary operational mode corresponding to a capacity operational mode or a power operational mode, further comprising:

determining if the request to set the control profile in accordance with the temporary operational mode is allowable based on at least the obtained route planning information and/or a determined number of active battery packs, and comprising testing the request against at least one predetermined criterion relating to the route planning information and/or the number of active battery packs, and based on an outcome of said test determining if the request is allowable, if said request is deemed allowable, setting the control profile in accordance with the temporary operational mode, and if said request to set the control profile in accordance with the temporary operational mode is deemed not allowable, rejecting the request and setting the control profile in accordance with the lifetime operational mode.

14. The method according to claim 13, wherein the route planning information comprises traffic information and/or information relating to speed limitations along the expected travelling route.

15. The method according to claim 13, further comprising obtaining weather data and energy use data relating to energy use of other vehicles along the expected travelling route, wherein the control profile is further set based on the obtained weather data and energy use data.

* * * * *